(12) United States Patent
Nowe et al.

(10) Patent No.: US 9,169,638 B2
(45) Date of Patent: Oct. 27, 2015

(54) EXPANDABLE VINYL AROMATIC POLYMERS

(75) Inventors: Stéphane Nowe, Monein (FR); Philippe Lodefier, Wemmel (BE); Laetitia Urbanczyk, Liège (BE)

(73) Assignee: TOTAL RESEARCH & TECHNOLOGY FELUY, Seneffe (Feluy) (BE)

( * ) Notice: Subject to any disclaimer, the term of this patent is extended or adjusted under 35 U.S.C. 154(b) by 300 days.

(21) Appl. No.: 13/821,602

(22) PCT Filed: Sep. 6, 2011

(86) PCT No.: PCT/EP2011/065347
§ 371 (c)(1),
(2), (4) Date: May 16, 2013

(87) PCT Pub. No.: WO2012/032022
PCT Pub. Date: Mar. 15, 2012

(65) Prior Publication Data
US 2014/0001394 A1  Jan. 2, 2014

(30) Foreign Application Priority Data
Sep. 10, 2010  (EP) ..................................... 10009443

(51) Int. Cl.
*C08J 9/16* (2006.01)
*C08J 9/00* (2006.01)
*E04B 1/78* (2006.01)

(52) U.S. Cl.
CPC ................. *E04B 1/78* (2013.01); *C08J 9/0066* (2013.01); *C08J 2325/04* (2013.01)

(58) Field of Classification Search
None
See application file for complete search history.

(56) References Cited

U.S. PATENT DOCUMENTS

| | | |
|---|---|---|
| 3,658,946 A | 4/1972 | Bronstert et al. |
| 3,660,535 A | 5/1972 | Finch et al. |
| 4,606,873 A | 8/1986 | Biglione et al. |
| 5,540,813 A | 7/1996 | Sosa et al. |
| 6,706,827 B1 | 3/2004 | Lyu et al. |
| 6,783,710 B1 | 8/2004 | Walder |
| 7,179,873 B2 | 2/2007 | Reimers et al. |
| 7,612,119 B2 | 11/2009 | Ponticiello et al. |
| 7,825,165 B2 | 11/2010 | Ghidoni et al. |
| 2005/0156344 A1 | 7/2005 | Dietzen et al. |
| 2006/0211780 A1 | 9/2006 | Passaplan et al. |
| 2007/0112082 A1 | 5/2007 | Hahn et al. |
| 2008/0096988 A1* | 4/2008 | Hahn et al. ..................... 521/56 |
| 2008/0248272 A1 | 10/2008 | Felisari et al. |
| 2009/0068354 A1 | 3/2009 | Ghidoni et al. |
| 2010/0130627 A1 | 5/2010 | Casalini et al. |
| 2011/0020542 A1 | 1/2011 | Ghidoni et al. |

FOREIGN PATENT DOCUMENTS

| | | |
|---|---|---|
| EP | 0372343 A1 | 6/1990 |
| EP | 0430496 A1 | 5/1991 |
| EP | 0620246 A1 | 10/1994 |
| WO | 9704577 A1 | 12/1997 |
| WO | 9745477 A1 | 12/1997 |
| WO | 2006058733 A1 | 8/2006 |
| WO | WO 2006108672 A2 * | 10/2006 |
| WO | 2008061678 A2 | 5/2008 |

OTHER PUBLICATIONS

Holland et al., "An XRD Morphology Index for Talcs: The Effect of Particle Size and Morphology on the Specific Surface Area," JDPDS—International Centre for Diffraction Data, 2000, vol. 42, pp. 421-428.*

Ferrage et al., "Talc as nucleating agent of polypropylene: morphology induced by lamella particles addition and interface mineral-matrix modelization," Journal of Materials Science 37 (2002), pp. 1561-1573.*

* cited by examiner

*Primary Examiner* — Kara Boyle

(57) ABSTRACT

An expandable vinyl aromatic polymer may include a matrix of a vinyl aromatic polymer, 1-10% of an expanding agent, 0.1 to 5% talc, carbon black, and 0 to 20% fillers. The expanding agent may be englobed in the matrix. The talc may have a mean diameter above about 8 μm as measured by Laser Mastersizer according to standard ISO 13320-1. The BET of the talc may be in the range 0.5-25 $m^2/g$. The carbon black may be present in a proportion sufficient for a foamed material obtained from the expandable vinyl aromatic polymer to have a thermal conductivity λ of about 34 mW/m° K or lower. The fillers may be homogeneously distributed in the matrix.

21 Claims, No Drawings

EXPANDABLE VINYL AROMATIC POLYMERS

CROSS-REFERENCE TO RELATED APPLICATIONS

This application claims the benefit of PCT/EP2011/065347, filed Sep. 6, 2011, which claims priority from EP 10009443.2, filed Sep. 10, 2010.

FIELD OF THE INVENTION

The present invention relates to expandable vinyl aromatic polymers with an enhanced heat insulation capacity and comprising carbon black and talc.

Expandable vinyl aromatic polymers, and among these, in particular, expandable polystyrene (EPS), are known products which have been used for a long time for preparing expanded articles which can be adopted in various applicative fields, among which one of the most important is the field of heat insulation. These expanded products are obtained by swelling beads of expandable polymer impregnated with a gas and molding the swollen particles contained inside a closed mould by means of the contemporaneous effect of pressure and temperature. The swelling of the particles is generally effected with vapour, or another gas, maintained at a temperature slightly higher than the glass transition temperature (Tg) of the polymer.

A particular applicative field of expanded polystyrene is that of thermal insulation in the building industry where it is generally used in the form of flat sheets. The flat expanded polystyrene sheets are normally used with a density of about 30 g/l as the thermal conductivity of the polymer has a minimum at these values.

BACKGROUND OF THE INVENTION

The term "expandable beads based on vinyl aromatic polymers" as used in the present description and claims, means vinyl aromatic polymers in the form of granules, containing an expanding system and other additives.

These expandable thermoplastic polymers in the form of granules are particularly used, after expansion and moulding, in the production of household appliances or other industrial equipment, in packaging and thermal insulation in the building industry, due to their thermo-insulating properties. Thermoplastic vinyl aromatic polymers such as polystyrene can be made expandable by incorporating an expandable agent in the polymeric matrix. Typical expanding agents for vinyl aromatic polymers include at least one liquid hydrocarbon containing from 3 to 7 carbon atoms, a halogenated hydrocarbon, carbon dioxide or water. The quantity of expanding agent usually ranges from 2 to 15% by weight. Expandable polymers are produced in general as beads or granules which, under the action of heat, supplied, for example, by steam, are first expanded until a desired density is reached and, after a certain aging period, are sintered in closed moulds to produce blocks or the desired final products.

The making of such expandable beads has already been described in EP 126459, US 2006 211780, US 2005 156344, U.S. Pat. No. 6,783,710 and WO 2008 141766.

The production of beads of PS incorporating pentane is difficult due to the balance required between ease of extrusion/granulation and foam process and compression resistance of the blocks made with the sintered expanded beads (the insulation boards etc. . . . ).

EP 372343 A1 at page 12 describes EPS comprising carbon black 0, 4, and 10 weight percent and talc: 0 to 0.20 weight percent. It is mentioned that the use of 10% carbon black reduces the thermal conductivity by 15%.

WO 97 45477 A1 describes an EPS comprising 2-8% carbon black having an area ranging from 10 to 500 m2/g. In examples 4 and 5 for 6 w % carbon black the thermal conductivity λ is 30-33 mW/m° K. There is no talc.

EP 620 246 B1 describes moulding comprising expanded polystyrene foam and an athermanous material, where the expanded polystyrene foam has a density of less than 20 kg/m$^3$ and the athermanous material absorbs infrared radiation. In an example for 2 w % carbon black and a foam density of 10 kg/m3 the thermal conductivity λ is 35 mW/m° K. There is no talc.

WO 2004-087798 A1 relates to expandable vinylaromatic polymers which comprise:
a) a matrix obtained by polymerizing 50-100% by weight of one or more vinylaromatic monomers and 0-50% by weight of a copolymerizable monomer; b) 1-10% by weight, calculated with respect to the polymer (a), of an expanding agent englobed in the polymeric matrix;
c) 0.01-20% by weight, calculated with respect to the polymer (a), of carbon black homogeneously distributed in the polymeric matrix having an average diameter ranging from 30 to 2000 nm, a surface area ranging from 5 to 40 m2/g, a sulfur content ranging from 0.1 to 2000 ppm and an ash content ranging from 0.001 to 1%. In an example for 1 w % carbon black the thermal conductivity λ is 36.5 mW/m° K. There is no talc.

WO 2006-058733 A1 relates to expandable styrene polymer granulates, which contain
a) between 5 and 50 wt. % of a filler, selected from pulverulent inorganic materials such as talc, chalk, kaolin, aluminium hydroxide, aluminium nitrite, aluminium silicate, barium sulphate, calcium carbonate, titanium dioxide, calcium sulphate, silicic acid, quartz powder, aerosil, alumina or wollastonite and
b) between 0.1 and 10 wt. % carbon black or graphite.
In example 2 there are 1 w % carbon black and 10 w % chalk, the thermal conductivity λ is 32 mW/m° K.

WO 2006 108672 A2 describes a process for improving the insulating capacity of expanded vinyl aromatic which comprises:
1) preparing beads of expandable vinyl aromatic polymers containing 1-10% by weight, calculated with respect to the polymer, of an expanding agent englobed in the polymeric matrix and 0.001-25% by weight, calculated with respect to the polymer (a), of an athermanous additive comprising carbon black homogeneously distributed in the polymeric matrix;
2) treating the surface of the beads, before deposition of the coating, with a liquid lubricating agent; and
3) thermally treating the beads with hot air at a temperature ranging from 30 to 60° C.

In an example for 1 w % carbon black the thermal conductivity λ is 35.2 mW/m° K. In an example for 1 w % carbon black the thermal conductivity λ is 33 mW/m° K. In an example for 1 w % carbon black+1 w % graphite the thermal conductivity λ is 32 mW/m° K. There is no talc.

US 2007 0112082 A1 relates to a moldable-foam molding with a density from 8 to 200 g/l, obtainable via fusion of prefoamed foam beads comprising expandable pelletized thermoplastic polymer materials, wherein the pelletized polymer materials comprise from 1 to 50% by weight, of one or more fillers selected from the group consisting of talc, chalk, kaolin, aluminum hydroxide, magnesium hydroxide, aluminum nitrite, aluminum silicate, calcium carbonate, calcium sulfate, silica, powdered quartz, Aerosil, alumina and glass beads. In an embodiment the moldable foam molding further comprises from 0.1 to 10% by weight of carbon black or graphite. In an example for 1 w % carbon black and 10 w % chalk, a foam density of 18.8 kg/m3 the thermal conductivity λ is 35.2 mW/m° K.

WO 2007 045454 A1 relates to expandable granulates, having compositions based on vinyl-aromatic polymers, essentially consisting of:
a) 65-99.8% by weight of a copolymer obtained by polymerizing 85-100% by weight of one or more vinyl-aromatic monomers having general formula (I) and 0-15% by weight of an a-alkylstyrene in which the alkyl group contains from 1 to 4 carbon atoms;
b) 0-25% by weight, calculated with respect to the polymer (a), of a carbon black having an average diameter ranging from 10 to 1000 nm and a surface area ranging from 5 to 200 m2/g;
c) at least one of the following additives (cl)-(c3): ci) 0.01-5% by weight, calculated with respect to the polymer (a), of graphite having an average diameter ranging from 0.5 to 50 μm; c2) 0.01-5% by weight, calculated with respect to the polymer (a), of oxides and/or sulfates and/or lamellar dichalcogenides of metals of groups hA, IIIA, IIB, IyE, VIE or VIIIB, c3) 0.01-5% by weight, calculated with respect to the polymer (a), of inorganic derivatives of silicon of the lamellar type;
d) 0-5% by weight, calculated with respect to the polymer (a), of a nucleating agent; and
e) 1-6% by weight, calculated with respect to 100 parts of the total of (a)-(d), of one or more expanding agents.

In an example there is 4 w % of carbon black. There is no talc and no thermal conductivity is cited.

WO 2008 141766 A1 relates to a process to make EPS. In the examples at table 2 there is 5.2% of graphite or 4.7% of talc. There are no examples in which talc and graphite or carbon black are simultaneously present.

WO 2008 061678 A2 relates to expandable vinyl aromatic polymers which comprise:
a) a matrix obtained by polymerizing 50-100% by weight of one or more vinyl aromatic monomers and 0-50% by weight of at least one copolymerizable monomer;
b) 1-10% by weight calculated with respect to the polymer (a), of an expanding agent englobed in the polymeric matrix;
c) 0.01-20% by weight, calculated with respect to the polymer (a), of a filler including carbon black electrically conductive and homogeneously distributed in the polymeric matrix, with a surface area, measured according to ASTM D-3037189, ranging from 5 to 200 m2/g.

In the examples for 1 to 4 w % carbon black, a foam density of 17 kg/m3 the thermal conductivity λ is ranging from 31 to 33.3 mW/m° K. In an example for 1 w % carbon black and 0.2 w % graphite, a foam density of 18.3 kg/m3 the thermal conductivity λ is 30.1 mW/m° K. There is no talc.

It has now been discovered that by selecting a talc having a mean diameter above about 8 μm, said mean diameter being measured by Laser Mastersizer according to standard ISO 13320-1, the proportion of carbon black can be lowered. Simultaneously the 10% compression strength is maintained over a wide range of foam density.

BRIEF SUMMARY OF THE INVENTION

The present invention is an expandable vinyl aromatic polymer which comprises:

a) a matrix of a vinyl aromatic polymer,
b) 1-10% by weight calculated with respect to the polymer (a), of an expanding agent englobed in the polymeric matrix,
c) 0.1 to 5% by weight calculated with respect to the polymer (a), of talc having a mean diameter above about 8 μm, said mean diameter being measured by Laser Mastersizer according to standard ISO 13320-1, the BET of the talc being is in the range 0.5-25 m2/g,
d) carbon black in a proportion sufficient for the foamed material obtained from the expandable vinyl aromatic polymer to have a thermal conductivity λ of about 34 mW/m° K or lower,
e) 0-20% by weight, calculated with respect to the polymer (a), of one or more fillers, other than talc and carbon black, homogeneously distributed in the polymeric matrix.

The expandable vinyl aromatic polymer of the invention is produced in the form of beads or granules.

The thermal conductivity λ of about 34 mW/m° K means that it could be in the range 33.5 to 34.5 mW/m° K. Advantageously the thermal conductivity λ is between about 33 and 34 mW/m° K, more advantageously between about 32 and 33 mW/m° K, preferably between about 31 and 32 mW/m° K and more preferably between about 30 and 31 mW/m° K.

The present invention also relates to a process for preparing the composition wherein it is carried out by mixing the vinyl aromatic polymer in the melted state with the blowing agent or agents, carbon black, talc and optionally the fillers.

In an advantageous embodiment the mixing is carried out in a chamber equipped with at least one stirring means and under temperature and pressure conditions which are capable of preventing expansion of the composition, preferably in an extruder, in particular a single-screw or twin-screw extruder, or in one or more static mixers at a temperature greater than the glass transition temperature of the polymer, in particular a temperature ranging from 120 to 250° C. and under an absolute pressure ranging from 0.1 to 10 MPa.

The present invention also relates to the use of the expandable vinyl aromatic polymer to make expanded articles, in particular insulation boards.

In an embodiment the moulded and expanded article is produced by a process comprising the following steps:
(i) a step of pre-expansion, by contacting and mixing the composition, which is in the form in particular of expandable particles or, preferably, expandable beads, with water vapour, in particular in a stirred tank, under pressure and temperature conditions capable of forming expanded particles or expanded beads having in particular a bulk density ranging from 5 to 200 kg/m3, preferably from 5 to 100 kg/m3 and in particular from 5 to 50 kg/m3,
(ii) a step of stabilizing the particles or beads thus expanded, by contacting them with ambient air, and
(iii) a step of moulding the particles or beads thus stabilized, by introducing them into a mould and by heating the mould so as to weld the particles or beads to one another and so to produce a moulded and expanded article having in particular the desired bulk density and, preferably a bulk density substantially identical to that of the expanded particles or expanded beads obtained in step (i).

DETAILED DESCRIPTION OF THE INVENTION

As regards the vinyl aromatic polymer, mention may be made of:
polystyrene, elastomer-modified polystyrene,
copolymers of styrene and acrylonitrile (SAN), elastomer-modified SAN, in particular ABS, which is obtained, for example, by grafting (graft polymerization) of styrene and acrylonitrile on a backbone of polybutadiene or of butadiene-acrylonitrile copolymer, mixtures of SAN and ABS, copolymers with styrene blocks and blocks made of butadiene or isoprene or of a mixture butadiene/isoprene, these block copolymers can be linear blocks copolymers or star blocks copolymers, they can be hydrogenated and/or functionalized. These copolymers are described in ULLMANN'S ENCYCLOPEDIA OF INDUSTRIAL CHEMISTRY, fifth edition (1995) Vol A26, pages 655-659, They are sold by Total Petrochemicals under the trade mark Finaclear®, by BASF under the trade mark Styrolux®, under the trade mark K-Resin® by Chevron Phillips Chemical, SBR (Styrene butadiene rubber), Possible examples of the abovementioned elastomers are EPR (the abbreviation for ethylene-propylene rubber or ethylene-propylene elastomer), EPDM (the abbreviation for ethylene-propylene-diene rubber or ethylene-propylene-diene elastomer), polybutadiene, acrylonitrile-butadiene copolymer, polyisoprene, isoprene-acrylonitrile copolymer and copolymers with styrene blocks and blocks made of butadiene or isoprene or of a mixture butadiene/isoprene. These block copolymers can be linear blocks copolymers or star blocks copolymers, they can be hydrogenated and/or functionalized (see above).

In the above vinyl aromatic polymer just mentioned, part of the styrene may be replaced by unsaturated monomers copolymerizable with styrene, for example alpha-methylstyrene or (meth)acrylates, Other examples of styrene copolymers which may be mentioned are chloropolystyrene, poly-alpha-methylstyrene, styrene-chlorostyrene copolymers, styrene-propylene copolymers, styrenebutadiene copolymers, styrene-isoprene copolymers, styrene-vinyl chloride copolymers, styrene-vinyl acetate copolymers, styrene-alkyl acrylate copolymers (methyl, ethyl, butyl, octyl, phenyl acrylate), styrene-alkyl methacrylate copolymers (methyl, ethyl, butyl, phenyl methacrylate), styrene methyl chloroacrylate copolymers and styrene-acrylonitrile-alkyl acrylate copolymers.

In a specific embodiment the vinyl aromatic polymer comprises:

i) from 60 to 100 weight % of one or more $C_{8-12}$ vinyl aromatic monomers; and ii) from 0 to 40 weight % of one or more monomers selected from the group consisting of $C_{1-4}$ alkyl esters of acrylic or methacrylic acid and acrylonitrile and methacrylonitrile; which polymer may be grafted onto or occluded within from 0 to 20 weight % of one or more rubbery polymers.

By way of example rubbery polymers can be selected from the group consisting of:

a) co- and homopolymers of $C_{4-6}$ conjugated diolefins, b) copolymers comprising from 60 to 85 weight % of one or more $C_{4-6}$ conjugated diolefins and from 15 to 40 weight % of a monomer selected from the group consisting of acrylonitrile and methacrylonitrile and c) copolymers comprising from 20 to 60, preferably from 40 to 50 weight % of one or more $C_{8-12}$ vinyl aromatic monomers which are unsubstituted or substituted by a $C_{1-4}$ alkyl radical and from 60 to 40, preferably from 60 to 50 weight % of one or more monomers selected from the group consisting of $C_{4-6}$ conjugated diolefins.

The rubber may be prepared by a number of methods, preferably by emulsion or solution polymerization. These processes are well known to those skilled in the art. The vinyl aromatic polymers may be prepared by a number of methods. This process is well known to those skilled in the art.

If present, preferably the rubber is present in an amount from about 3 to 10 weight %. Polybutadiene is a particularly useful rubber.

In the specific embodiment in which the vinyl aromatic polymer is polystyrene, it could be a crystal polystyrene or a rubber modified polystyrene. The rubber modified polystyrene is called HIPS (High Impact Polystyrene). The process for making HIPS is well known to those skilled in the art. The rubber is "dissolved" in the styrene monomer (actually the rubber is infinitely swollen with the monomer). This results in two co-continuous phases. The resulting "solution" is fed to a reactor and polymerized typically under shear. When the degree of polymerization is about equal to the weight % of rubber in the system it inverts (e.g. the styrene/styrene polymer phase becomes continuous and the rubber phase becomes discontinuous. After phase inversion the polymer is finished in a manner essentially similar to that for finishing polystyrene. The polymer is prepared using conventional bulk, solution, or suspension polymerization techniques.

The vinyl aromatic polymers of the present invention may be co- or homopolymers of $C_{8-12}$ vinyl aromatic monomers. Some vinyl aromatic monomers may be selected from the group consisting of styrene, alpha methyl styrene and para methyl styrene. Preferably the vinyl aromatic monomer is styrene. The vinyl aromatic polymer may be a copolymer comprising from 60 to 100 weight % of one or more $C_{8-12}$ vinyl aromatic monomers; and from 0 to 40 weight % of one or more monomers selected from the group consisting of $C_{1-4}$ alkyl esters of acrylic or methacrylic acid and acrylonitrile and methacrylonitrile. Suitable esters of acrylic and methacrylic acid include methyl acrylate, ethyl acrylate, butyl acrylate, methyl methacrylate, ethyl methacrylate and butyl methacrylate. The vinyl aromatic polymers of the present invention may be rubber modified.

Advantageously the vinyl aromatic polymer is a monovinylaromatic polymer.

In an embodiment the vinyl aromatic polymer can be a branched aromatic ionomer. As regards the branched aromatic ionomer, it is described in WO 2006 081295 the content of which is incorporated in the present application. the branched aromatic ionomer comprises the product of co-polymerizing a first monomer comprising an aromatic moiety and an unsaturated alkyl moiety and a second monomer comprising an ionic moiety and at least two unsaturated moieties, wherein the ionic moiety has at least two ionizable groups, a cationic group that ionizes to form cations and an anionic group that ionizes to form anions, and wherein the cationic group is polyvalent and one capable of forming bridges to other molecules.

Advantageously the first monomer is selected from the group consisting of styrene, alphamethyl styrene, t-butylstyrene, p-methylstyrene, vinyl toluene, and mixtures thereof. Preferably the first monomer is styrene.

Components that may be used as the second monomer include, but are not limited to: zinc diacrylate, zinc dimethacrylate, zinc di-vinylacetate, zinc di-ethylfumarate, and the like; copper diacrylate, copper dimethacrylate, copper di-vinylacetate, copper di-ethylfumarate, and the like; aluminum triacrylate, aluminum trimethacrylate, aluminum tri-vinylacetate, aluminum tri-ethylfumarate, and the like; zirconium tetraacrylate, zirconium tetramethacrylate, zirconium tetra-vinylacetate, zirconium tetra-ethylfumarate, and the like. For components having monovalent cationic groups the second monomer may be sodium acrylate, sodium methacrylate, silver methacrylate, and the like. These components and any component useful as the second monomer may be prepared by, for example, reacting an organic acid or an anhydride with a metal or metal salt.

Advantageously the second monomer is selected from the group consisting of: zinc diacrylate, zinc dimethacrylate, zinc di-vinylacetate, zinc di-ethylfumarate, and the like; copper diacrylate, copper dimethacrylate, copper di-vinylacetate, copper di-ethylfumarate, and the like; aluminum triacrylate, aluminum trimethacrylate, aluminum tri-vinylacetate, aluminum tri-ethylfumarate, and the like; zirconium tetraacrylate, zirconium tetramethacrylate, zirconium tetra-vinylacetate, zirconium tetra-ethylfumarate, and mixtures thereof. Preferably the second ionomer is zinc diacrylate or zinc dimethacrylate.

The first monomer can be a mixture of various aromatic monomers comprising an aromatic moiety and an unsaturated alkyl moiety and for can be used alone or in a mixture of up to 50% by weight with other co-polymerizable monomers. Examples of said monomers are (meth)acrylic acid, Ci-C4 alkyl esters of methacrylic acid, such as methyl acrylate, methyl methacrylate, ethyl acrylate, ethyl methacrylate, iso-propyl acrylate, butyl acrylate, amides and nitriles of (meth) acrylic acid, such as acrylamide, methacrylamide, acrylonitrile, methacrylinitrile, butadiene, ethylene, divinyl benzene, maleic anhydride, etc. Preferred co polymerizable monomers are acrylonitrile and methyl methacrylate.

The monomers used to prepare the branched aromatic ionomers may interact in several ways to affect the physical properties of the ionomers. A first way is the formation of covalent bonds due to the polymerization of the unsaturated moieties. A second way that the monomers used to prepare the branched aromatic ionomers may interact is by the formation of a bridge wherein a polyvalent cationic group is coordinated to two anionic groups which are integrated into the backbones of at least two separate chains. This coordination may, in effect, cross link the two chains thereby increasing that segment's total effective molecular weight to the sum of the two chains. A third way that that the monomers used to prepare the branched aromatic ionomers may interact is by the formation of multiple bridges as described immediately above. The more crosslinking that occurs, the less flexible the three dimensional structure of the ionomer, which may result in lower melt flow values and increased melt strength. In yet a fourth way of interacting, when the cationic groups are mono-valent, the ionic moieties, while not fully bridged, may still associate due to hydrophobic-hydrophilic forces.

In these embodiments, this weaker but still measurable force may result from the comparatively non-polar hydrophobic, non-ionic parts of the molecule being mutually attracted and repelled from the polar hydrophilic ionic parts of the ionomer. These forces are more noticeable as the proportion of the second monomer is increased in concentration. These four are not all of the possible interactions of the monomers. In addition, most of the properties of the ionomers associated with its primary, secondary, and even tertiary structure, such as the ionomers' glass transition temperatures "Tg" may be affected.

Both the amount of second monomer and the type of interaction with the first monomer will dictate the amount of second monomer used. Therefore, in some embodiments where the interaction is weak, such as when the cationic group of the second monomer is mono-valent, and a significant amount of effect is desired from the second monomer, the branched ionomers are prepared with a comparatively large amount of the second monomer, typically with a ratio of first monomer to second monomer of from about 999:1 to about 40:60. In other such embodiments, the ratio is from about 95:5 to about 50:50. In still other such embodiments, the ratio is from about 90:10 to about 60:40. Other embodiments have a ratio of from 80:20 to 70:30. Where the interaction is very strong, such as when the cationic group is di- or tri-valent, or only small changes to the properties of the ionomer due to the second monomer are desired, the amount of the second monomer is quite small ranging from about 10 parts per million "ppm" to about 10,000 ppm. In other such ionomers, the range is from about 100 ppm to about 1000 ppm. In still other such ionomers, the range is from about 250 ppm to about 800 ppm.

The branched aromatic ionomer is prepared by co-polymerizing the first and second monomers. Each of these monomers has at least one polymerizable unsaturation. The polymerization may be carried out using any method known to those of ordinary skill in the art of performing such polymerizations. For example, the polymerization may be carried out by using a polymerization initiator. Examples of the polymerization initiators are, for instance, radical polymerization initiators such as benzoyl peroxide, lauroyl peroxide, t-butyl peroxybenzoate and 1,1-di-t-butylperoxy-2,4-di-t-butylcyclohexane. The amount of the polymerization initiator is from about 0 to about 1 percent by weight of the monomers. In one embodiment, the amount of polymerization initiator is from about 0.01 to about 0.5 percent by weight of the monomers. In another embodiment, the amount of polymerization initiator is from about 0.025 to about 0.05 percent by weight of the monomers.

Alternatively, rather than using an initiator, the ionomer may be prepared using heat as an initiator. The ionomer may be prepared using a non-conventional initiator such as a metallocene catalyst as is disclosed in U.S. Pat. No. 6,706,827 to Lyu, et al., which is incorporated herein in its entirety by reference. In one embodiment, the monomers may be admixed with a solvent and then polymerized. In another embodiment, one of the monomers is dissolved in the other and then-polymerized. In still another embodiment, the monomers may be fed concurrently and separately to a reactor, either neat or dissolved in a solvent, such as mineral oil.

In yet another embodiment, the second monomer may be prepared in-situ or immediately prior to the polymerization by admixing the raw material components, such as an unsaturated acid or anhydride and a metal alkoxide, in-line or in the reactor. Any process for polymerizing monomers having polymerizable unsaturation know to be useful to those of ordinary skill in the art in preparing such polymers may be used. For example, the process disclosed in U.S. Pat. No. 5,540,813 to Sosa, et al., may be used and is incorporated herein in its entirety by reference. The processes disclosed in U.S. Pat. No. 3,660,535 to Finch, et al., and U.S. Pat. No. 3,658,946 to Bronstert, et al., may be used and are both incorporated herein in their entirety. Any process for preparing general purpose polystyrene may be used to prepare the branched aromatic ionomers.

The branched aromatic ionomer can be mixed with up to 50% w of a GPPS.

The ionomers may be admixed with additives prior to being used in end use applications. For example, the ionomers may be admixed with fire retardants, antioxidants, lubricants, UV stabilizers, antistatic agents, and the like. Any additive known to be useful to those of ordinary skill in the art of preparing ionomers to be useful may be used with the branched ionomers.

As regards the expanding agent, it is selected from aliphatic or cyclo-aliphatic hydrocarbons containing from 3 to 6 carbon atoms such as n-pentane, iso-pentane, cyclopentane or blends thereof; halogenated derivatives of aliphatic hydrocarbons containing from 1 to 3 carbon atoms, such as, for example, dichlorodifluoromethane, 1,2,2-trifluoroethane, 1,1,2-trifluoroethane; carbon dioxide and water. As regards pentane advantageously a mixture of n and iso is used. The proportion of pentane is advantageously in the range 4 to 7 w %.

As regards talc having a mean diameter, also known as D50, above about 8 µm, said mean diameter being measured by Laser Mastersizer according to standard ISO 13320-1, one can cite the 20M00S supplied by the company Rio Tinto Minerals (Talcs de Luzenac). Advantageously the talc has a mean diameter above about 8 µm and under 100 µm, more advantageously in the range 8-50 µm, preferably in the range 8-30 µm, more preferably in the range 9-12 µm. In an embodiment the talc has a mean diameter above about 9 µm and under 100 µm, more advantageously in the range 9-50 µm, preferably in the range 9-30 µm.

Advantageously the D(95) is around 100 µm or below, more advantageously around 50 µm, much more advantageously around 40 µm, preferably around 30 µm. D(95) means that 95% of particles are smaller than this value. The BET of the talc is in the range 0.5-25 m2/g advantageously in the range 0.5-20 m2/g, more advantageously in the range 0.5-15 m2/g, preferably in the range 0.5-10 m2/g, more preferably in the range 0.5-5 m2/g and preferably in the range 3-4 m2/g.

The proportion of talc is advantageously from 0.5 to 2 w % and preferably from 0.5 to 1.5 w %, more preferably from 0.7 to 1.3 w %, still more preferably from 0.8 to 1.2 most preferably around 1%.

As regards the carbon black, the proportion can be determined easily by the man skilled in the art. The thermal conductivity of the foam decreases with the increasing proportion of carbon black. The range can be from about 1 to about 5 w %. It is easy with a reduced number of experiments to find the proportion to get a thermal conductivity λ of about 34 mW/m° K or lower of the foam. The carbon black has advantageously a surface area (preferably the BET nitrogen surface area), measured according to ASTM D-3037/89, ranging from 5 to 1000 m2/g, more advantageously from 5 to 800 m2/g. Preferably said surface area ranges from 50 to 100 m2/g and more preferably from 45 to 75 m2/g. One can cite the Ensaco® 150, Ensaco® 210, Ensaco® 250, Ensaco®260 and Ensaco® 350 supplied by the company Timcal. In an embodiment said area ranges from 50 to 1000 m2/g, advantageously from 50 to 800 m2/g.

As regards the fillers, one can cite any material capable to reduce the thermal conductivity and/or to enhance the properties of the expanded vinyl aromatic polymer. One can cite graphite, mica, silica, titanium dioxide and barium sulfate.

One can cite also flame retardants, nucleating agents, plasticizers and agents which facilitate the demoulding of the moulded and expanded articles. In particular it may comprise at least one flame retardant selected in particular from halogenated hydrocarbons, preferably brominated hydrocarbons, in particular C6 to C12 hydrocarbons, such as hexabromocyclohexane, penta-bromomonochlorocyclohexane or hexabromocyclododecane, in an amount which can range from 0.05 to 2 parts, preferably from 0.1 to 1.5 parts, by weight, per 100 parts by weight of the styrene polymer. The composition may further comprise at least one nucleating agent selected in particular from synthetic waxes, in particular Fischer-Tropsch waxes and polyolefin waxes such as polyethylene waxes or polypropylene waxes, in an amount which can range from 0.05 to 1 part, preferably from 0.1 to 0.5 part, by weight per 100 parts by weight of the vinyl aromatic polymer. The composition may likewise comprise at least one plasticizer, selected in particular from mineral oils and petroleum waxes such as paraffin waxes, in an amount which can range from 0.1 to 1 part, preferably from 0.1 to 0.8 part, by weight per 100 parts by weight of the vinyl aromatic polymer. The composition may additionally comprise at least one agent which facilitates the demoulding of the moulded and expanded articles, selected in particular from inorganic salts and esters of stearic acid, such as glycerol mono-, di or tristearates and zinc stearate, calcium stearate or magnesium stearate, in an amount which can range from 0.05 to 1 part, preferably from 0.1 to 0.6 part, by weight per 100 parts by weight of the vinyl aromatic polymer.

As regards the mechanical properties of the foam, a parameter of importance is the 10% compression strength as a function of the density of the foam. The advantage of the compositions of the invention is they have a high 10% compression strength. They comply with a 10% compression strength (or strain value at 10% deformation) in kPa which is at least [7.14×density of the foam in kg/m3−28]. Which means about 50 kPa for a density of 11 kg/m3 and about 150 kPa for a density of 25 kg/m3.

As regards the process to make said expandable polymer, it is carried out by mixing the vinyl aromatic polymer in the melted state with the blowing agent or agents, talc carbon black and the fillers.

In an advantageous embodiment the mixing is carried out in a chamber equipped with at least one stirring means and under temperature and pressure conditions which are capable of preventing expansion of the composition, preferably in an extruder, in particular a single-screw or twin-screw extruder, or in one or more static mixers at a temperature greater than the glass transition temperature of the polymer, in particular a temperature ranging from 120 to 250° C. and under an absolute pressure ranging from 0.1 to 10 MPa.

The making of such expandable beads has already been described in EP 126459, US 2006 211780, US 2005 156344, U.S. Pat. No. 6,783,710 and WO 2008 141766, the content of which is incorporated in the present invention.

According to an embodiment the present invention relates to a process for preparing in mass and in continuous, expandable vinyl aromatic polymers, which comprises the following steps in series: (i) feeding the vinyl aromatic polymer, as described above, to an extruder, optionally together with fillers, (ii) heating the vinyl aromatic polymer to a temperature higher than the relative melting point; (iii) injecting the expanding agent and possible additives into the molten polymer before extrusion through a die; and (iv) forming expandable beads, through a die, with an average diameter ranging from 0.2 to 2 mm and advantageously made with an underwater pelletizer. The expandable beads produced are subjected to pre-treatment generally applied to conventional expandable beads and which essentially consists in:
1. coating the beads with an antistatic agent such as amines, tertiary ethoxylated alkylamines, ethylene oxide-propylene oxide copolymers, etc. The purpose of this agent is to facilitate the adhesion of the coatings
2. applying the "coating" to the above beads, said coating essentially consisting of a mixture of mono-, di- and tri-esters of glycerin (or other alcohols) with fatty acids and of metallic stearates such as zinc and/or magnesium stearate.

EXAMPLES

In all examples the melt index of polystyrene is measured at 200° C. under a 5 kg load.

Example 1

According to the Invention, Luzenac® Talc and Carbon Black

A mixture containing 96.5 parts of polystyrene (melt index 6.5, measured following DIN ISO 1133), 1 part of talc from Luzenac®, having a mean diameter of 10.5 μm and BET surface area of 3.8 m2/g, and 2.5 parts of carbon black, characterized by BET surface area of 70 m2/g, are fed in an extruder. 6 w % of pentane (80/20 n-/iso pentane) is injected in the extruder through a specific line. The melt is finally granulated at die exit with an underwater pelletizer. The recovered beads, whose diameter is in the range 0.3-2 mm, are then treated with a coating agent like zinc stearate and optionally glycerol mono- bi- or tri-stearate. The treated beads are pre-expanded with steam at 100° C., left to age for 1 day and finally used to mold the board. After 1 day, the density of the board, determined by weighing the board and measuring its dimensions, is 20.8 g/l. After at least 30 ageing days, the measured thermal conductivity of this panel is 0.0305 W/mK according to standart ISO 8301. The sample is also subjected to compression test. The strain value at 10% deformation, evaluated following EN826 standart, is 125 kPa.

Example 2

Not According to the Invention, Luzenac® Talc and No Carbon Black

Expandable beads are produced with the same conditions as described in Example 1, except that the initial mixture contains 99 parts of polystyrene (melt index 11.2, following DIN ISO 1133) and 1 part of talc from Luzenac®, having a mean diameter of 10.5 μm and BET surface area of 3.8 m2/g. The board obtained has a density of 21.4 g/l. After at least 30 ageing days, the measured thermal conductivity of this panel is 0.0355 W/mK according to standart ISO 8301. The sample is also subjected to compression test. The strain value at 10% deformation, evaluated following EN826 standart, is 135 kPa.

Example 3

According to the Invention, Luzenac® Talc and Carbon Black

Expandable beads are produced with the same conditions as described in Example 1, except that the initial mixture contains 96 parts of polystyrene (melt index 11.2, following DIN ISO 1133), 1 part of talc from Luzenac®, having a mean diameter of 10.5 μm and BET surface area of 3.8 m2/g, and 3 parts of carbon black, characterized by BET surface area of 770 m2/g. The board obtained has a density of 19.3 g/l. After at least 30 ageing days, the measured thermal conductivity of this panel is 0.0310 W/mK according to standart ISO 8301. The sample is also subjected to compression test. The strain value at 10% deformation, evaluated following EN826 standart, is 121 kPa.

Example 4

Not According to the Invention, Finntalc® and Carbon Black

Expandable beads are produced with the same conditions as described in Example 1, except that the initial mixture contains 96.5 parts of polystyrene (melt index 11.2, following DIN ISO 1133), 1 part of talc from Finntalc®, having a mean diameter of 5 μm and BET surface area of 6 m2/g, and 2.5 parts of carbon black, characterized by BET surface area of 70 m2/g. The board obtained has a density of 21.1 g/l. After at least 30 ageing days, the measured thermal conductivity of this panel is 0.032 W/mK according to standart ISO 8301. The sample is also subjected to compression test. The strain value at 10% deformation, evaluated following EN826 standart, is 117 kPa.

Example 5

Not According to the Invention, Finntalc® and Carbon Black

Expandable beads are produced with the same conditions as described in Example 1, except that the initial mixture contains 94 parts of polystyrene (melt index 11.2, following DIN ISO 1133), 1 part of talc from Finntalc®, having a mean diameter of 5 μm and BET surface area of 6 m2/g, and 5 parts of carbon black, characterized by BET surface area of 70 m2/g. The board obtained has a density of 22.2 g/l. After at least 30 ageing days, the measured thermal conductivity of this panel is 0.0309 W/mK according to standart ISO 8301. The sample is also subjected to compression test. The strain value at 10% deformation, evaluated following EN826 standart, is 110 kPa.

Example 6

Not According to the Invention, Jetfine® and Carbon Black

Expandable beads are produced with the same conditions as described in Example 1, except that the initial mixture contains 96 parts of polystyrene (melt index 11.2, following DIN ISO 1133), 1 part of talc Jetfine®, having a mean diameter of 3.9 μm and BET surface area of 21 m2/g, and 3 parts of carbon black, characterized by BET surface area of 770 m2/g. The board obtained has a density of 20 g/l. After at least 30 ageing days, the measured thermal conductivity of this panel is 0.0330 W/mK according to standart ISO 8301. The sample is also subjected to compression test. The strain value at 10% deformation, evaluated following EN826 standart, is 95 kPa.

Example 7

Not According to the Invention, Jetfine® and No Carbon Black

Expandable beads are produced with the same conditions as described in Example 1, except that the initial mixture contains 99 parts of polystyrene (melt index 11.2, following DIN ISO 1133) and 1 part of talc Jetfine, having a mean diameter of 3.9 μm and BET surface area of 21 m2/g. The board obtained has a density of 22 g/l. After at least 30 ageing days, the measured thermal conductivity of this panel is 0.0358 W/mK according to standart ISO 8301. The sample is also subjected to compression test. The strain value at 10% deformation, evaluated following EN826 standart, is 128 kPa.

Comparison between various examples:

| Example | Talc mean diameter (D50)[1] | Talc D95* | Carbon black spec. surf. Area (m$^2$/g)[2] | Carbon black (wt %) | Board density (g/l) | λ (W/mK)[3] | 10% compr. Strength (kPa)[4] |
|---|---|---|---|---|---|---|---|
| 1 | 10.5 | 30 | 70 | 2.5 | 20.8 | 0.0305 | 125 |
| 2 | 10.5 | 30 | — | 0 | 21.4 | 0.0355 | 135 |
| 3 | 10.5 | 30 | 770 | 3 | 19.3 | 0.0310 | 121 |
| 4 | 5 | 18 | 70 | 2.5 | 21.1 | 0.032 | 117 |
| 5 | 5 | 18 | 70 | 5 | 22.2 | 0.0308 | 110 |
| 6 | 3.9 | 8 | 770 | 3 | 20 | 0.0330 | 95 |
| 7 | 3.9 | 8 | — | 0 | 22 | 0.0358 | 128 |

[1]Measured with laser mastersizer according to standart ISO 13320-1.
[2]Measured according to ASTM D3037-89.
[3]Measurement performed following standart ISO 8301.
[4]Measurement performed following standart EN 826.

The data in Table 1 show that the combination of talc, characterized by a mean diameter of 10.5 μm, with 2.5 or 3 wt % of carbon black (Examples 1 and 3, respectively) leads to enhanced insulation properties compared to trials where talc of smaller particle size is combined with the same amount of carbon black, as described in Examples 4 and 6. There is thus a synergistic action between carbon black and the particular talc grade used, i.e. talc with mean particle size above 8 μm and D95 below 100 μm, which leads to better insulation capability. In fact, the trial of Example 5 shows that with the use of finer talc (mean diameter of 5 μm), the amount of carbon black must be doubled to reach similar insulation efficiency than the trial shown in Example 1, where the talc with mean particle size above 8 μm and D95 below 100 μm is advantageously used. It must also be noted that the use of a higher amount of carbon black (5%) has a detrimental impact on foam compression resistance (see Example 5). It is therefore advantageous to use the synergy between the particular talc grade mentioned and carbon black to avoid such drawback. The synergy between carbon black and talc with mean particle size above 8 μm and D95 below 100 μm works either with carbon black grades of low or high specific surface area, as shown is Examples 1 and 3, where similar results are obtained with carbon black of respectively 70 and 770 m$^3$/g specific surface area.

The invention claimed is:

1. An expandable vinyl aromatic polymer comprising:
    a) a matrix of a vinyl aromatic polymer,
    b) 1-10% by weight calculated with respect to the vinyl aromatic polymer, of an expanding agent englobed in the matrix,
    c) 0.1 to 5% by weight calculated with respect to the vinyl aromatic polymer, of talc having a mean diameter above about 8 μm, said mean diameter being measured by Laser Mastersizer according to standard ISO 13320-1, the BET of the talc being in the range 0.5-25 m$^2$/g,
    d) carbon black in a proportion sufficient for a foamed material obtained from the expandable vinyl aromatic polymer to have a thermal conductivity λ of about 34 mW/m° K or lower,
    e) 0-20% by weight, calculated with respect to the vinyl aromatic polymer, of one or more fillers, other than talc and carbon black, homogeneously distributed in the matrix.

2. The expandable vinyl aromatic polymer according to claim 1, wherein the expandable vinyl aromatic polymer is in the form of beads or granules.

3. The expandable vinyl aromatic polymer according to claim 1, wherein the talc has a mean diameter above about 8 μm and under 100 μm.

4. The expandable vinyl aromatic polymer according to claim 1, wherein the talc has a mean diameter in the range of 8-50 μm.

5. The expandable vinyl aromatic polymer according to claim 1, wherein the talc has a mean diameter in the range of 8-30 μm.

6. The expandable vinyl aromatic polymer according to claim 1, wherein the talc has a D(95) around 100 μm.

7. The expandable vinyl aromatic polymer according to claim 1, wherein the talc has a D(95) around 50 μm.

8. The expandable vinyl aromatic polymer according to claim 1, wherein the talc has a D(95) around 40 μm.

9. The expandable vinyl aromatic polymer according to claim 1, wherein the talc has a D(95) around 30 μm.

10. The expandable vinyl aromatic polymer according to claim 1, wherein the proportion of talc is from 0.5 to 1.5 w %.

11. The expandable vinyl aromatic polymer according to claim 1, wherein the proportion of carbon black is from about 1 to about 5 w %.

12. The expandable vinyl aromatic polymer according to claim 1, wherein the BET nitrogen surface area of the carbon black, measured according to ASTM D-3037/89, ranges from 5 to 1000 m$^2$/g.

13. The expandable vinyl aromatic polymer according to claim 1, wherein the BET nitrogen surface area of the carbon black, measured according to ASTM D-3037/89, ranges from 50 to 1000 m$^2$/g.

14. The expandable vinyl aromatic polymer according claim 1, wherein the thermal conductivity λ of the foamed material obtained from the expandable vinyl aromatic polymer is between about 33 and 34 mW/m° K.

15. The expandable vinyl aromatic polymer according to claim 1, wherein the thermal conductivity λ of the foamed material obtained from the expandable vinyl aromatic polymer is between about 32 and 33 mW/m° K.

16. The expandable vinyl aromatic polymer according to claim 1, wherein the thermal conductivity λ of the foamed material obtained from the expandable vinyl aromatic polymer is between about 30 and 31 mW/m° K.

17. A process comprising making an expanded article from an expandable vinyl aromatic polymer, wherein the expandable vinyl aromatic polymer comprises:
    a) a matrix of a vinyl aromatic polymer;
    b) 1-10% by weight calculated with respect to the vinyl aromatic polymer, of an expanding agent englobed in the matrix;
    c) 0.1 to 5% by weight calculated with respect to the vinyl aromatic polymer, of talc having a mean diameter above about 8 μm, said mean diameter being measured by Laser Mastersizer according to standard ISO 13320-1, the BET of the talc being in the range 0.5-25 m²/g;

d) carbon black in a proportion sufficient for the expanded article to have a thermal conductivity λ of about 34 mW/m° K or lower;

e) 0-20% by weight, calculated with respect to the vinyl aromatic polymer, of one or more fillers, other than talc and carbon black, homogeneously distributed in the matrix.

18. The expandable vinyl aromatic polymer according to claim 1, wherein the 10% compression strength (in kPa) of the foamed material obtained from the expandable vinyl aromatic polymer is at least equal to [(7.14×a density of the foamed material in kg/m³)−28].

19. An expandable vinyl aromatic polymer comprising:
a) a matrix of a vinyl aromatic polymer;
b) 1-10% by weight calculated with respect to the vinyl aromatic polymer, of an expanding agent englobed in the matrix;
c) 0.5 to 2% by weight calculated with respect to the vinyl aromatic polymer, of talc having a mean diameter above about 8 μm, said mean diameter being measured by Laser Mastersizer according to standard ISO 13320-1, the BET of the talc being in the range 0.5-25 m²/g;

d) carbon black in a proportion sufficient for a foamed material obtained from the expandable vinyl aromatic polymer to have a thermal conductivity λ of about 34 mW/m° K or lower;

e) 0-20% by weight, calculated with respect to the vinyl aromatic polymer, of one or more fillers, other than talc and carbon black, homogeneously distributed in the matrix.

20. The expandable vinyl aromatic polymer according to claim 19, wherein the talc has a D(95) of around 100 μm, or around 50 μm, or around 40 μm, or around 30 μm.

21. The expandable vinyl aromatic polymer according to claim 19, wherein the BET nitrogen surface area of the carbon black, measured according to ASTM D-3037/89, ranges from 50 to 1000 m²/g.

* * * * *